United States Patent

[11] 3,588,254

| [72] | Inventor | John M. Rhoades |
| | | Waynesboro, Va. |
| [21] | Appl. No. | 759,721 |
| [22] | Filed | Sept. 13, 1968 |
| [45] | Patented | June 28, 1971 |
| [73] | Assignee | General Electric Company |

[54] FREQUENCY CONTROL FOR TUNABLE LASER UTILIZED IN A POSITION CONTROL SYSTEM
13 Claims, 3 Drawing Figs.

[52] U.S. Cl. .................................................. 356/106,
331/94.5
[51] Int. Cl. ..................................................... G01b 9/02
[50] Field of Search ........................................... 356/106-
—113; 331/94.5

[56] References Cited
FOREIGN PATENTS
1,474,640   2/1967   France ........................

*Primary Examiner*—Ronald L. Wibert
*Assistant Examiner*—T. Major
*Attorneys*—Lawrence G. Norris, Michael Masnik, Stanley C. Corwin, Frank L. Neuhauser, Oscar B. Waddell and Melvin M. Goldenberg ABSTRACT: A calibration system for a tunable laser utilized as a position indicating device in a position control system includes an interferometer counting the interference fringes in a pattern produced by the laser output and a portion of the output returned from a prism disposed on a carriage which is moved through a precisely known, repeatable movement. By using the interferometer output to count down a digital counter into which a number has been preset which corresponds to the change in the number of fringes that should be observed at a given laser frequency, any remaining count after the movement indicates error due to changes in transmission characteristics of the beam path. The remaining count may then be used to provide an analog voltage for adjustment of the laser frequency.

INVENTOR.
JOHN M. RHOADES
BY Michael Masnik
HIS ATTORNEY

INVENTOR.
JOHN M. RHOADES
BY Michael Masnik
HIS ATTORNEY

FREQUENCY CONTROL FOR TUNABLE LASER UTILIZED IN A POSITION CONTROL SYSTEM

BACKGROUND OF THE INVENTION

This invention relates generally to position control systems using a tunable laser position indicator and, more particularly, to a calibrating circuit for such a tunable laser.

This apparatus is intended primarily for use with distance measurement and position control systems of various types for indicating and controlling the position of a given device. One such position control system is disclosed in U.S. Pat. No. 3,248,622, L. U. C. Kelling, assigned to the assignee of the present invention, which involves comparison of a variable-phase, high frequency control signal and position signal, both of which are referenced to a reference signal. The comparison product, or desired position control signal, may be applied to a servomotor to move the device to a desired position. Systems of this type usually utilize mechanical position indicating means, such as a resolver, which are physically connected through a gearing arrangement to the device whose position is being monitored. The angular position of the electromechanical device's shaft produces a voltage in the windings thereof which is representative of the actual device position.

It has recently been proposed to provide a position indicator which furnishes a digital output, the digital value representing the actual device position. One such system utilizes a fixed frequency laser whose beam is directed through an interferometer towards a mirror mounted on the device. This beam is directed by the mirror along a path parallel to the original back towards the interferometer. As part of the light transmitted from the laser has been directed by a beam splitter at right angles to the transmission direction, comparison of this light with the returned beam produces in interference pattern of fringes whose number is directly proportional to the change in the total number of wavelengths the beam has traveled. By means of suitable photodetecting apparatus, the number of fringes can be counted and converted into a plurality of discrete pulses, one such pulse being produced for a given number of fringes. After coupling these pulses to a digital counter and providing appropriate conversion factors between fringe counts and a desired unit of measure, the counter provides a direct readout in that unit measure of the change in distance between the interferometer and the device.

It can be shown that the number of fringes is directly related to both the frequency and wavelength of the light which is transmitted by the laser. Therefore, a very accurate measurement of the device position must take into account propagation anomalies in the transmission path between the interferometer and the device. For instance, the wavelength of a light beam transmitted in air, the usual medium, is affected by changes in air temperature, humidity, and air pressure, among others along the path of light transmission and the frequency of the light beam. In order that an accurate count may be produced, it is necessary, therefore, to compensate for these variations so that a digital readout of a measurement of the device position at one particular time equals that taken at a subsequent point of time. Such accuracy is especially important when many work operations are desired, or when the device position is to be very accurately controlled over a long period of time.

To compensate for these anomalies, it has been necessary to make measurements of the ambient temperature, pressure, humidity, and other variables, and either manually or automatically introduce into the conversion factor between fringe counts and the desired unit of measure a correction factor which compensates for the changes in wavelength from that initially calibrated in a measuring system. Such an approach has additional problems in that the measuring devices have an accuracy and precision limit which many times is below that which is desired of the position measuring device.

SUMMARY OF THE INVENTION

It is therefore an object of this invention to provide an improved signal processing arrangement.

It is an object of this invention to provide a position indicating device for a digital or other position control system including a laser and interferometer which provides a precise and accurate indication of a device position.

It is a further object of this invention to provide precise and accurate indication by means of a laser and interferometer combination which is independent of changes in the wavelength of the laser beam in the medium of transmission, such as air, and does not require separate measurement of parameters of that medium to compensate for such changes.

It is a further object to provide continuous modification of a position feedback measuring system employing an interferometer wherein the coherent light source frequency is controlled to accommodate environmental changes affecting the wavelength of the light.

Briefly, these objects and others are achieved according to one embodiment of the invention by providing a second interferometer and a standard positioning device which has a predetermined coefficient of thermal expansion, and by utilizing a tunable laser whose frequency may be controlled by an output from the second interferometer.

BRIEF DESCRIPTION OF THE DRAWINGS

The subject matter of the invention is particularly pointed out and distinctly claimed in the concluding portion of the specification. For a complete understanding of one embodiment of the invention together with other objects and advantages thereof, reference should be made to the following description taken in conjunction with the accompanying drawings in which:

DESCRIPTION OF THE PREFERRED EMBODIMENT

Figure 1:
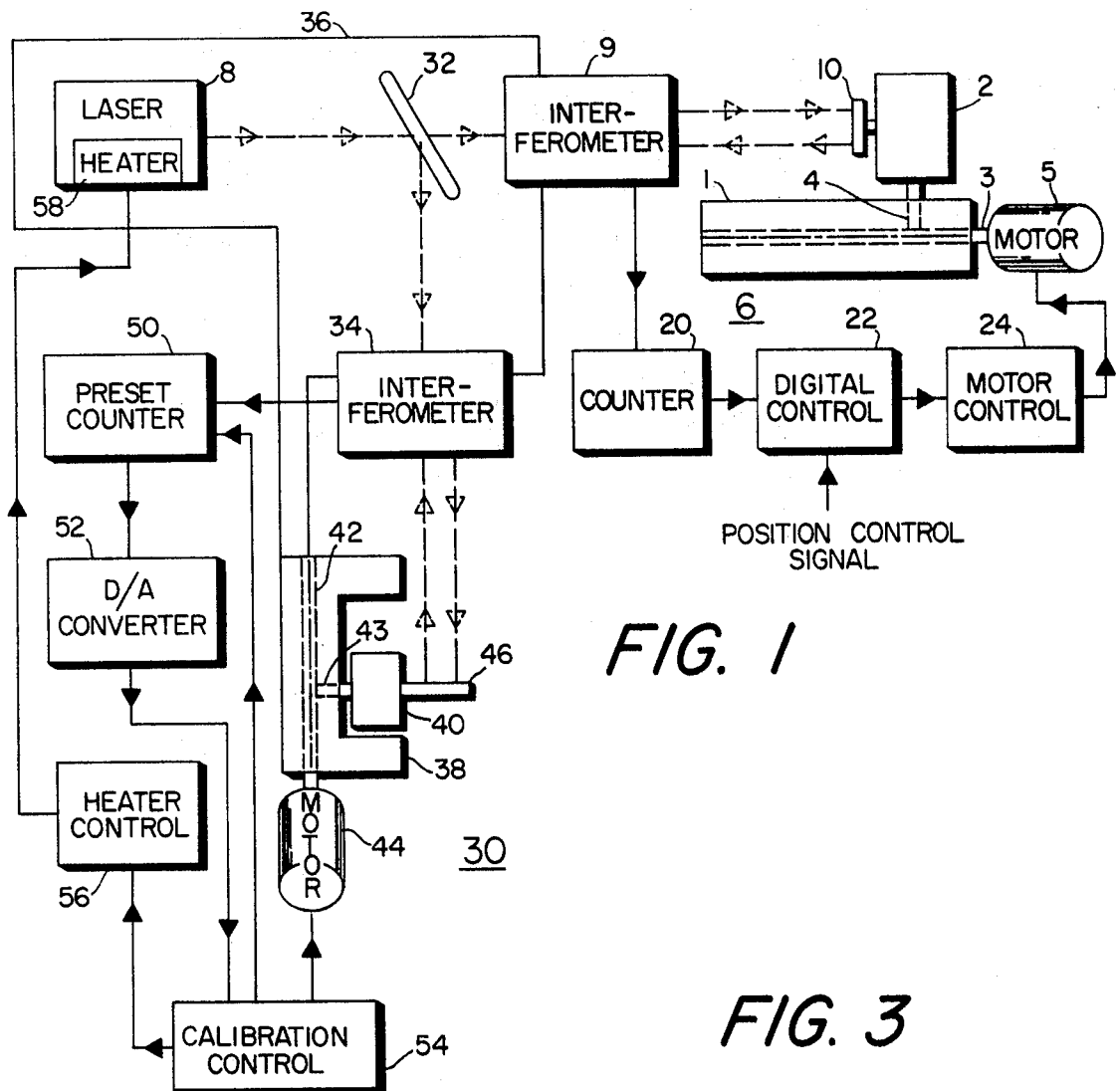
FIG. 1 is a block diagram of a position indicating system for use with a machine tool position control system.

Reference should be made to the position control system illustrated in FIG. 1 which is designed for use with a device whose position is to be controlled such as a machine tool including a table 1 and a movable carriage 2. Carriage 2 is positioned with respect to table 1 by means of a lead screw 3 which rotates in the table and which moves carriage 2 by means of a gear arrangement 4. In turn, the position of lead screw 3 is controlled by means of servomotor 5 which, in most cases, is a DC shunt wound motor of low speed and high torque capacity. A feedback control system generically designates at 6 controls the servomotor 5 so that carriage 2 may be positioned accurately and precisely with respect to table 1. The particular feedback control system illustrated is that utilizing a combination of a position indicating device including a laser and an interferometer and a digital control signal comparison system. Such a system is more fully detailed and claimed in copending application Ser. No. 737,461 whose details are incorporated by reference herein. Generally, the feedback control system 6 includes a position indicating device 7 utilizing a laser 8 and an interferometer and photodiode combination 9. The interferometer may be any using the Michelson principle which measures the fringe count which occurs when optical comparison is made of a transmitted beam and a reflected beam. A complete disclosure and discussion of the Michelson interferometer principle can be found in the McGraw-Hill Encyclopedia of Science and Technology, *Interferometry*, pp. 190 —192, v. 7, (1960). An interferometer of this type is commercially available from the Perkin-Elmer Company and sold thereby as model INF-1. However, any device would be acceptable which is adapted to measure the fringes in an interference pattern between a transmitted and a reflected beam.

A wave of coherent light is generated by laser 8 and transmitted as a single beam through the interferometer 9 towards a mirror or reflecting prism 10 mounted on the carriage 2. In the interferometer 9, the coherent wave has a portion directed therefrom at right angles by a beam splitter prism. Upon reaching the reflecting prism 10, the coherent beam is reflected and directed along a parallel but distinct path back toward the interferometer 9.

Upon reaching the interferometer, the return beam is projected upon a prism surface along with the beam directed from the transmitted beam by the beam splitter prism. The interference of these waves at the prism surface produces a visible interference pattern having a discrete number of interference fringes therein. By the use of suitably placed photodiodes or photodetectors, a discrete electrical output can be provided therefrom which is responsive to a select number of the interference fringes. For example, the interference pattern may be projected upon a second beam splitter prism which transmits a first portion thereof through a polarizing screen to a first photodiode and which transmits a second portion thereof, at right angles to the first, through a second polarizing screen to a second photodiode. The electrical output from these photodiodes varies sinusoidally in proportion to the total beam length, which is twice the distance between the first beam splitter prism within interferometer 9 and the reflecting prism 10. Thus, for one particular path length, the output of the photodetectors will be a given voltage. To produce this voltage, the output of one photodetector will be at a certain level and the other will be shifted sinusoidally 90°. By suitable calibration, the output of each photodiode will undergo a complete sinusoidal cycle for every $\lambda/2$ increment in the total path length, where $\lambda$ =wavelength of the transmitted, coherent beam. Thus, every half cycle thereof equals a $\lambda/4$ increment in such path length. The other photodetector operates similarly, its output being shifted by 90°. By referencing these outputs to a reference level, clipping the sinusoidal variation thereof to produce a square pulse for each positive or negative portion, and combining them in algebraic addition, the above-mentioned voltage can be obtained. While the device position is being changed, the output comprises a series of pulses, one such pulse being produced for each $\lambda/8$ change in path length. By counting the total number of pulses produced in a given movement, the change in device position and thus the new actual position can be measured.

This combined output is fed to a first counter circuit 20 which may include both digital counting devices and a digital or numerical readout device. Counter circuit 20 also includes means to convert the combined pulse output, representing changes in wavelength, to increments of a unit of physical measurement, such as inches, meters, or the like. This conversion means requires that a number be preset therein as a conversion factor. In one particular embodiment, a pulse to the digital counting device within counter circuit 20 is produced for every 0.00001 inch travel of the carriage 2.

To use the circuitry so far illustrated as a position indicating device, the carriage 2 is moved to a reference position. All count is removed from the digital counting devices in counter 20 and carriage 2 is moved to a desired position. The resultant changes in the interference pattern within interferometer 9, or the number of fringe counts observed, produce a corresponding series of pulses to the digital counting devices within counter 20. By converting these pulses to a corresponding series of digital counts by multiplication by the preset conversion number, a digital number in measurement units can be accumulated which is representative of the change of the carriage position from the reference position.

This digital number is embodied in the output of counter 20 which is connected to a digital control circuit 22, also disclosed in the aforementioned copending application. Circuit 22 has as another input an analog or digital position control signal and provides a comparison of the digital number with the position control signal. An analog voltage output from circuit 22 is coupled to the difference between the actual and desired position signals proportional to a motor control circuit 24 which in turn drives the servomotor 5 to move the carriage to the desired position by means of lead screw 3.

As previously noted, changes in the wavelength of light along the light path due to propagation anomalies or changes in the velocity transmission characteristics of the light path or a change in light frequency, previously have been compensated for by physical measurement of the ambient and corresponding manual or automatic changes in the conversion number fed into counter circuit 20. In the prior art, laser 8 comprised a fixed or single frequency device which was thermally isolated from the ambient to maintain the frequency thereof relatively constant. In addition, compensation for thermal or other errors caused by dimension change in interferometer 9 was accomplished by making the mounting components therein of a material having zero coefficient of thermal expansion, such as Invar, and disposing all active components within a thermostatically controlled oven.

In the present invention, both laser 8 and interferometer 9 are thermally isolated as before. In distinction to the prior art, propagation anomalies are compensated by change in the frequency of the coherent beam transmitted from laser 8, rather than by changes in the conversion factor set into counter circuit 20. To this end, laser 8 is provided with a separate calibration system, generically denoted as 30, which changes the laser output frequency depending upon a comparison of fringes produced by a second interferometer measuring the movement of a reference carriage. The calibration system also may have the additional advantage of being able to automatically provide for changes in the physical dimensions of the carriage 2 whose position is being measured, as well as in the physical dimensions of the position indicating device itself.

Laser 8 comprises a tunable laser of a type to be described later. The coherent beam from laser 8 is directed towards interferometer 9 through a beam splitter 32 which directs a portion of the beam at right angles therefrom towards a second interferometer 34. Interferometer 34 may be similar to interferometer 9 and no further discussion thereof will be made. Both interferometer 34, beam splitter 32, interferometer 9 and laser 8 are disposed on a common bed 36. Likewise disposed on bed 36 is a standard slide table 38 whose components are made of a material having a thermal coefficient of expansion corresponding to that of table 1 to compensate for the thermal effects on table 1 and slide table 38. If an absolutely accurate measurement of position is desired, the material comprising the standard slide 38 should have a zero thermal coefficient of expansion, such as Invar. The standard slide table 38 includes a carriage 40 which is laterally moved with respect to slide table 38 and bed 36 by means of a lead screw 42 and a gear arrangement 43 coupling therebetween. Lead screw 42 in turn is rotated by a DC servomotor 44 which may be of the same type as DC servomotor number 5, though of less capacity. Disposed on carriage 40 is a reflecting prism 46 of a type similar to reflecting prism 10 disposed on carriage 2. In this regard, light from laser 8 is directed towards beam splitter 32 and thereafter passes to both interferometers 9 and 34. The light directed to interferometer 34 passes therethrough and is reflected from reflecting prism 46 in a parallel but distinct path back towards interferometer 34.

An output from interferometer 34 is introduced into a digital preset counter 50 which in turn provides a digital output to a digital-to-analog converter 52. The output from converter 52 is in the form of an analog voltage whose value represents the digital output from counter 50 and is connected to the input of a calibration control circuit 54. Three outputs of circuit 54 are connected to servomotor 44, preset counter 50 and to a heater control circuit 56 which in turn applies a control voltage to a heater 58 of tunable laser 8.

The functioning of calibration system 30 is directly based upon the principle that the transmission velocity of a coherent light beam is dependent upon the characteristics of the medium through which the beam must travel. In most cases in which this invention will be used, the medium will be air. Since air is a gas, it can be shown by well-known techniques that as the air pressure increases, the velocity of transmission decreases, and that as the air temperature increases, the velocity of transmission increases. Now, since the wave length of light in a particular medium is directly proportional to the velocity of transmission, if that velocity is increased, the wave length is accordingly increased. On the other hand, if the velocity of transmission is decreased, the wave length is accordingly decreased.

Combining these factors, it can be seen that if the air pressure increases, the wave length of light traveling therethrough will be decreased and that if the temperature increases, the wave length of light will be increased. Of course, other parameters have similar effects upon the velocity of transmission.

The practical effect of this phenomenon with respect to position indicating devices using lasers having a fixed, single frequency, is that in measuring a change of position of a device, such as carriage 2, with respect to a reference position, the number of interference fringe counts that are observed is directly dependent upon the wave length of the coherent light beam traveling in the air medium. If that wave length is increased, the number of fringe counts will decrease, since one pulse may be produced for a given increment of wavelength, such as $\lambda/4$. For example, if the temperature of the ambient increases, the wave length increases and the number of fringe counts decreases, producing an error in the measurement of a position change of carriage 2. This error makes the position indicated appear closer to the reference position than it actually is. On the other hand, if the temperature decreases, the wave length decreases and the position indicated appears farther from the reference position than it actually is.

To compensate for the changes in wave length, calibration system 30 provides a means for adjusting the frequency of the transmitted laser beam.

In this regard, carriage 40 is designed to have a known, repeatable movement with respect to table 38 and thus interferometer 34 which can be made accurate and precise to a large degree by existing machining techniques. For instance, carriage 40 could be designed to move a total distance of 1.000000 inch when actuated by servomotor 44. Furthermore, a number is inserted into preset counter 50 which should equal the observed number of fringe counts obtained from interferometer 34 when the carriage 40 is moved through the known, repeatable movement. For instance, if the repeatable movement were 1.000000 inch, and interferometer 34 or additional circuitry within preset counter 50 produced a pulse output for every 0.00001 inch travel of carriage 40, then 100,000 fringe counts should be produced during the movement. If this number is preset into counter 50, then any difference between that count and the count actually observed indicates an error which is directly attributable to a change in the velocity of transmission of the air medium or the existing laser frequency.

The remaining circuitry of calibration system 30 including digital-to-analog converter 52 and heater control 56 continuously converts the fringe count error as the number is reduced to zero into a control signal which adjusts the coherent beam frequency of laser 8 to a value such as to compensate for the observed change in velocity of transmission.

The function of calibration control circuit 54 is to automatically provide for this sequence of calibration steps. Therefore, circuit 54 initiates a given time period during which the carriage 40 is moved to an initial position and counter 50 is preset to a number which should equal the number of fringe counts observed during the known, repeatable movement. Thereafter, carriage 40 is moved through the known, repeatable movement by means of a signal applied to servomotor 44. During the movement, preset counter 50 receives pulses from interferometer 34 and counts down from the preset number. After the known, repeatable movement has been completed, the number remaining in preset counter 50 is converted into an analog voltage by means of digital-to-analog converter 52. The analog voltage is then applied through a switching contact of calibration circuit 52 to the heater control circuit 56 which provides a proportional control signal suitable to adjust heater 58 to a value which produces the desired coherent beam frequency. Heater control circuit 56 is energized, in a preferred embodiment, during only that portion of the time period when the movement has been completed and an analog voltage is present at the output of digital-to-analog converter 52.

The invention may be better understood by discussion of a specific example. Assuming that the known, repeatable movement is 1.000000 inch, the number preset into counter 50 should be 100,000 if the initial frequency of laser 8 and the design of interferometer 34 is such that a pulse is produced for every 0.00001 inch travel of carriage 40. For the purposes of discussion, the distance or the path length between interferometer 34 and the initial position of carriage 40 may be assumed to be much greater than the known, repeatable movement. If the velocity of transmission is increased, then fewer fringe counts than 100,000 will be observed by interferometer 34 during the movement. Therefore, the count remaining in preset counter 50 will be a positive number, for instance, 1000. Accordingly, conversion of the digital number 1000 to an analog voltage by converter 52 and subsequent adjustment of heater 58 by means of heater control 56 increases the frequency of laser 8 and thus decreases the wave length of the transmitted, coherent beam. However, since the total beam length upon which the fringe counts are based includes both the distance between interferometer 34 and the initial position of carriage 40, and the known, repeatable movement, this frequency correction overcompensates, as the fringe count error includes a variable proportional to the known, repeatable movement and the greater path length. In effect, the error in count, which was based upon the known, repeatable movement of 1.000000 inch, has been multiplied by the greater path length. Succeeding calibration periods would be required to reduce the observed error.

By proper design, the initial compensation provided to heater 58 can be made to equal the compensation needed for velocity changes, thus eliminating the need for subsequent calibration steps. If the path length is made a multiple of the known, repeatable movement, as for example 10 inches, an additional decade counter may be added to preset counter 50 and the effect of the path length upon the fringe counts observed may be divided out. In more detail, the known, repeatable movement produces approximately as many fringe counts as needed to provide frequency compensation. The additional decade simply removes the factor of 10 from the digital signal applied to digital-to-analog converter 52.

Figure 2:
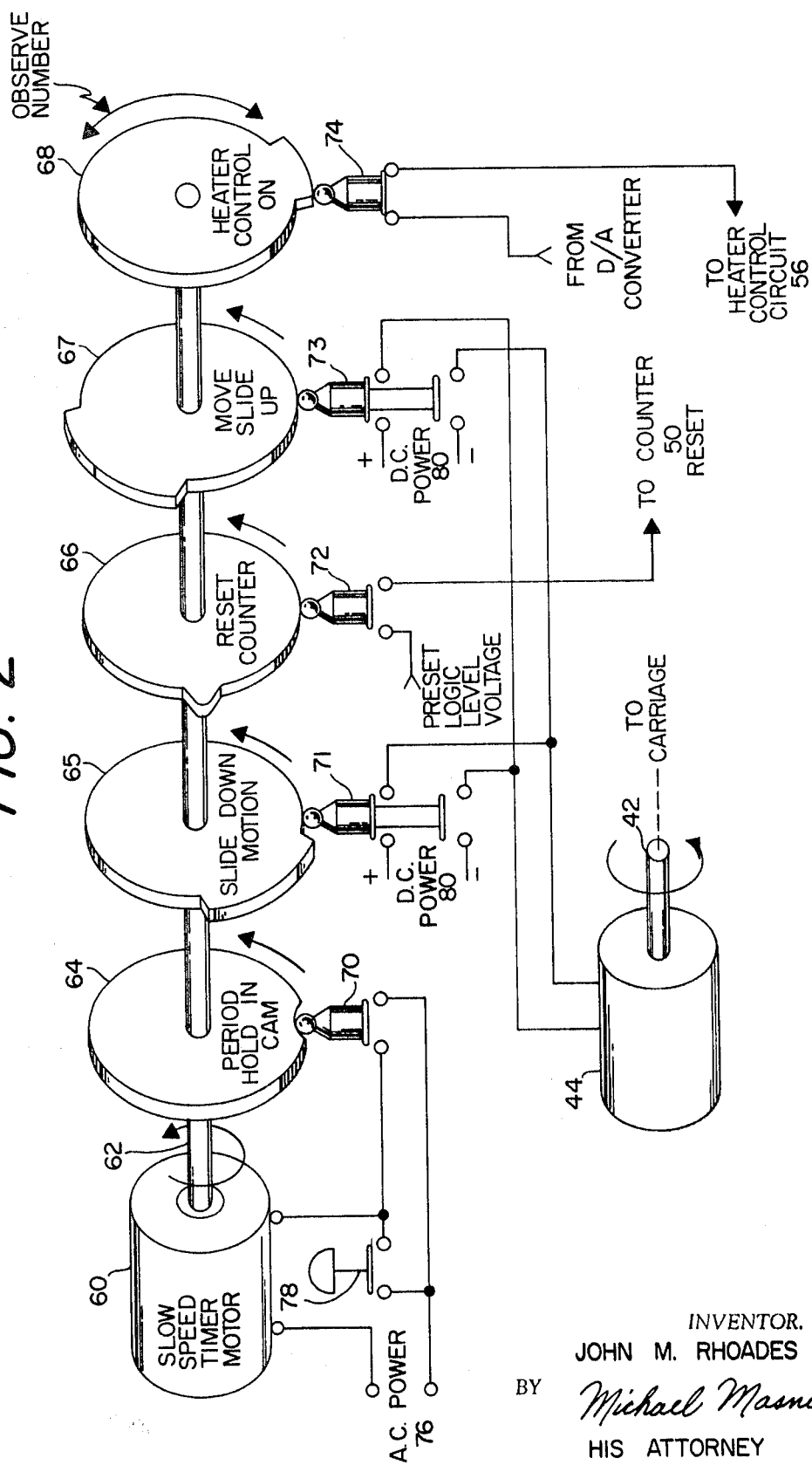
FIG. 2 is a schematic diagram of one embodiment of the calibration control circuit of FIG. 1.

Illustrated in FIG. 2 is an embodiment of the calibration control circuit 54. Included therein is a slow speed, timer motor 60 having a shaft 62 upon which is mounted a plurality of cams 64, 65, 66, 67 and 68 which engage in turn movable members of switches 70, 71, 72, 73 and 74. Slow speed motor 60 is supplied from an AC power source 76, one terminal of which is directly connected to motor 60. The other terminal of source 76 is connected to motor 60 through the medium of either a start switch 78 or switch 70. When start switch 78 is depressed, motor 60 is energized and begins to rotate at a slow rate. Thereafter, cam 65 provides a period hold by engaging switch 70. One revolution of shaft 62 determines the time period associated with calibration control circuit 54. At a time subsequent to that when motor 60 begins to rotate, cam 65 engages switch 71 to connect a source of DC power 80 to servomotor 44 to move the carriage 40 to the initial position. Thereafter, switch 71 is disengaged.

Switch 72 has connected to one terminal thereof a reset logic voltage whose value may be chosen in accordance with the specific circuitry of preset counter 50 to reset the decade counters therein to the preset number. Accordingly, the other terminal of switch 72 is connected to preset counter 50. Cam 66 has a small engaging surface thereon which engages switch 72 at a time subsequent to the completion of the initial movement of carriage 40 as determined by cam 65 and switch 71.

Thereafter, cam 67 engages switch 73 to which the DC voltage source 80 has been applied in a reverse fashion from that connected to switch 71 and servomotor 44 is moved in a reverse direction to the initial movement to produce the known, repeatable movement. During this time, counter 50 counts down from its preset number by means of pulses supplied by interferometer 34. At the end of the known, repeatable movement, the number remaining in counter 50 is that necessary to adjust heater 58 to a value to compensate for the fringe count error.

A quiescent portion of the time period now ensues in order that the digital number present in counter 50 may be sensed by digital-to-analog converter 52 and converted to a suitable analog voltage. This voltage is applied to one terminal of switch 74. In the remaining portion of the time period, cam 68 engages switch 74 to connect the analog voltage from converter 52 to heater control circuit 56. The frequency of laser 8 is then adjusted by means of a signal from heater control circuit 56 and the calibration period may be repeated, if needed, by subsequent depression of start switch 78.

Of course, it may be realized by those skilled in the art that calibration control circuit 54 may be implemented by means of electronic circuitry including a clock source establishing the time period and providing pulses to various gating circuitry for controlling motor 44 and thus carriage 40, counter 50, and control circuit 56 in a prearranged fashion.

Figure 3:
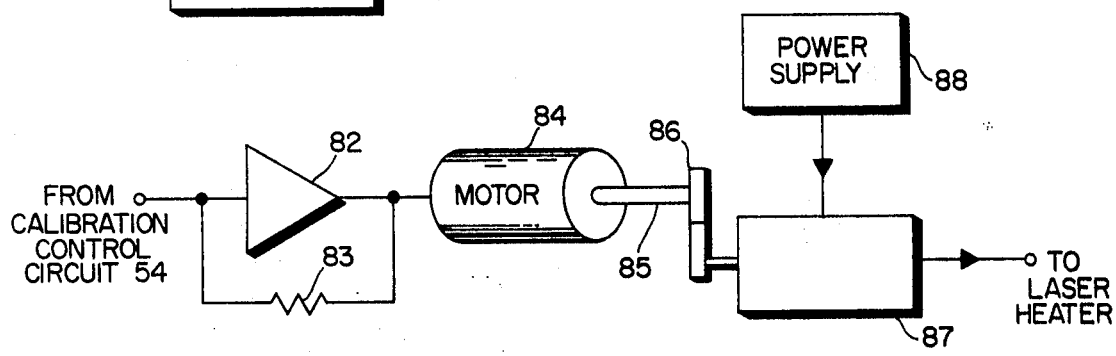
FIG. 3 is a schematic diagram of one embodiment of the heater control circuit of FIG. 1.

Now turning to FIG. 3, an embodiment of heater control circuit 56 is illustrated which comprises an operational amplifier 82 having appropriate feedback circuitry 83. An input to operational amplifier 82 is provided from the DC voltage output of the calibration control circuit 54 or from, in the embodiment of FIG. 2, switch 74. Thus, the analog voltage produced by converter 52 is amplified and referenced by operational amplifier 82 to a value suitable for the ensuing circuitry of control circuit 56. In the embodiment illustrated, this circuitry includes a DC servomotor 84 of low speed and high torque capacity whose shaft 85 is coupled by means of a gear mechanism 86 to a variable resistor or an autotransformer 87. A power supply 88 is coupled to variable resistor or autotransformer 87 and may comprise either the aforementioned DC power supply 80 or the aforementioned AC power supply 76. The output taken from variable resistor or autotransformer 87 is coupled directly to the laser frequency control circuit, such as heater 58. In operation, the magnitude of the DC analog voltage, proportional to the number remaining in preset counter 50, is applied to servomotor 84 to drive the motor at a speed proportional to this error digital number in counter 50. Since the heater control circuit 56 is energized only for a given time which excludes the time of the calibration count period, as determined by calibration control 54, the voltage output of the variable resistor or autotransformer 87 is changed, for example, by a movable tap, at a rate which is directly proportional to the digital number remaining in counter 50. When this number is reduced to zero, the motor stops at a position which supplies the required heater power for the proper measuring frequency.

As with the calibration control circuit 54 illustrated in FIG. 2, the heater control circuit 56 may be embodied in suitable solid state circuitry, including silicon controlled rectifiers in place of variable resistor or autotransformer 87 and an integrating circuit in place of motor 84.

In all the embodiments heretofore described, control of the frequency of laser 8 has been by means of a heater 58 and the voltage applied thereto. Such description has particular applicability to tunable lasers including a lithium metaniobate crystal which functions by the principle of parametric oscillation at optical frequencies whereby a "pump" light from a fixed frequency laser enters the crystal at one surface and two output beams having distinct frequencies emerge from the other crystal surface. By varying the temperature of the crystal, as by an electric heater and a temperature control therefor, the output frequencies may be varied by varying the crystal's index of refraction. The lithium metaniobate laser produces output frequencies ranging from about $2.6 \times 10^5$ gigacycles to $3.1 \times 10^5$ gigacycles. The corresponding range in wave length is 11,500 A.° to 9,700 A.°. It may be seen that if the laser is tuned to a wave length of approximately 10,000 A.°, the fringe dimensions in an interference pattern occur at $40 \times 10^{a16}$ inches. If the interferometer 34 is designed so that a pulse is produced for every λ/4 count, then each fringe count would equal $10 \times 10^6$ inch and very accurate and precise calibration and measurement could be accomplished by means of the position indicating device illustrated in FIG. 1.

In accordance with this convenient requirement of laser output wave length of approximately 10,000 A.°, it may be seen that other tunable lasers may be used. For instance, an indium-potassium semiconductor injection crystal has a center laser frequency of approximately 9,600 A.°. Such a semiconductor injection laser may be tuned by change in temperature, a magnetic field thereabout, or physical pressure upon the crystal surface.

Other lasers having outputs in this frequency range or wave length may be suggested. It is to be clearly understood by those skilled in the art that the invention is not limited to the use of lithium metaniobate or indium-potassium lasers, but rather to any tunable laser which provides for a continuously variable frequency output around a wave length of interest. In this regard, although 10,000 A.° has been suggested as convenient for measurement and calibration purposes involving inch measurement units, the invention is not limited thereto and it can be seen that by proper choice of the circuitry comprising interferometer 34 and preset counter 50 that suitable lasers having other frequency ranges may be used and other measurement units, such as metric, may be employed.

It has been mentioned that the carriage 40, as well as slide table 38, should be made of a material whose thermal coefficient of expansion compensates for changes in transmission characteristics of the beam path. If the carriage 40 is made of a material having a zero coefficient of thermal expansion, such as Invar, calibration of the coherent output frequency of laser 8 may be made absolute with respect to temperature, pressure and other variations in transmission characteristics. However, it may be desired that the measurement change in direct proportion to increase in either temperature, or other variations. If temperature were chosen as a parameter, the carriage 40 may be made of a material having a thermal coefficient of expansion which equals that of carriage 2 thereby providing the same position measurement for different temperatures.

While this invention has been described with respect to a preferred embodiment and several illustrative examples thereof, it is to be clearly understood by those skilled in the art that the invention is not limited thereto and that the preferred embodiment merely illustrates simple digital and analog circuitry for the implementation of calibration system 30. The invention is intended to be bound only by the limits of the appended claims.

What is claimed as new and desired to be secured by Letters Patent of the United States is:

I claim:

1. A calibrating system for a position indicating device including a tunable laser producing a coherent light beam output and including means for continuously varying the frequency of said coherent output over a given range, comprising:
    a. carriage means operable through a known, repeatable movement;
    b. reflecting means disposed on said carriage means;
    c. an interferometer producing an interference pattern between said coherent light beam output and a portion thereof directed toward and returning from said reflecting means, said interferometer providing an output pulse for a discrete change in position of said carriage means;
    d. digital counter means operable by said output pulses of said interferometer;
    e. control means for presetting a first digital number in said counter means and for actuating said carriage means through a known, repeatable movement, the first digital number being proportional to the number of pulses which should be obtained from said interferometer during said movement, said counter means thereby counting from the first number and retaining a second digital number after said movement, the second digital number being representative of anomalies in the wave length of the light along the propagation path between said interferometer and said reflecting means;

f. means converting the second digital number in said counter means into a control signal for the frequency varying means of the tunable laser; and, g. means applying the control signal to the frequency varying means.

2. The calibration system of claim 1, further comprising:
a. a table rigidly disposed at a fixed position with respect to said interferometer, said carriage being operable therein;
b. a source of a supply voltage; and,
c. a servomotor coupled to said carriage means through said table, said servomotor being controllable by application of said supply voltage through said control means.

3. The calibrating system of claim 1 wherein said control means further comprises:
a. timing means establishing a predetermined time period;
b. first means, coupled to said timing means, for actuating said carriage means to an initial position during a first portion of said time period;
c. means, coupled to said timing means, for presetting the first digital number during a second portion of said time period; and,
d. second means, coupled to said timing means, for actuating said carriage means through the known, repeatable movement during a third portion of said time period.

4. The calibration system of claim 3, further comprising:
a. a table rigidly disposed at a fixed position with respect to said interferometer, said carriage being operable therein;
b. a source of a supply voltage; and,
c. a servomotor coupled to said carriage means through said table, said servomotor being controllable by application of said supply voltage through said first and second actuating means.

5. The calibration system of claim 3 wherein said converting means further comprises:
a. a digital-to-analog converter having an input thereof coupled to said digital counter means for converting the second digital number into an analog voltage at its output;
b. switching means having its input connected to the output of said digital-to-analog converter, said switching means being coupled to said timing means, for presenting said analog voltage at its output during a fourth portion of said time period; and,
c. a frequency control circuit for changing said analog voltage into said control signal.

6. The calibration system of claim 5, further comprising:
a. a table rigidly disposed at a fixed position with respect to said interferometer, said carriage being operable therein;
b. a source of a supply voltage; and,
c. a servomotor coupled to said carriage means through said table, said servomotor being controllable by application of said supply voltage through said first and second actuating means.

7. The calibration system of claim 6 wherein said frequency control circuit further includes:
a. an operational amplifier having an input thereof coupled to said analog voltage;
b. a second servomotor supplied by the output of said operational amplifier, said servomotor having a rotatable shaft; and,
c. a variable signal means mechanically coupled to said shaft and having said supply voltage connected thereto, said variable signal means changing said control signal at a rate proportional to the speed of said second servomotor shaft.

8. The calibration system of claim 6 wherein:

a. said timing means includes a timer motor having a rotatable shaft and means for rotating said shaft through one revolution by application of said supply voltage to said timer motor; and
b. said first and second actuating means, said presetting means and said switching means comprise a plurality of cams disposed on said rotatable shaft and a corresponding number of switch members having input and output terminals, said first, second third and fourth portions of said time period being established by the engagement of said cams and said switch members.

9. The calibration system of claim 8 wherein said frequency control circuit further includes:
a. an operational amplifier having an input thereof coupled to said analog voltage;
b. a second servomotor supplied by the output of said operational amplifier, said servomotor having a rotatable shaft; and,
c. a variable signal means mechanically coupled to said shaft and having said supply voltage connected thereto, said variable signal means changing said control signal at a rate proportional to the speed of said second servomotor shaft.

10. An arrangement for positioning an object comprising a source of desired position control signals, a source of actual position signals comprising a coherent light source and a primary interferometer for providing a count of the fringe lines of light representative of movement of the object, means for compensating for changes in the wave length of the light from said source along the medium in which the light is transmitted comprising means for reflecting a portion of the light from said source over a separate, predetermined change in distance, a calibration interferometer for counting fringe lines established by said reflected light and representative of said predetermined change in distance to provide a calibration interferometer count, means for providing a calibrated fringe count corresponding to a calibrated fringe count for said predetermined change in distance, means responsive to said calibrated count and said calibration interferometer count for providing a control signal, and means for changing the frequency of said light source in accordance with said control signal.

11. An arrangement according to claim 10 wherein said means for providing a calibrated fringe count comprises a reversible counter and means for presetting a calibrated fringe count in said counter, and means for applying said calibration interferometer count to said counter to provide said control signal.

12. An arrangement for positioning an object comprising a source of desired position control signals, a position feedback device for providing actual position signals indicating the actual position of said object comprising a coherent light source and an interferometer responsive to light from said source being reflected over a path representative of movement of the object for providing a count of the fringe lines of light representative of object movement, means for compensating for changes in the wave length of the light from said source along said path comprising means for reflecting a portion of the light from said source over a separate, programmable change in distance, means for providing a calibration signal corresponding to a given fringe count for said change in programmable distance, a calibration interferometer for counting fringe lines established by said reflected light and representative of said programmable distance, means responsive to any difference between the calibration signal and said last-named count of fringe lines for generating a control signal, and means for changing the frequency of said light source in accordance with said control signal.

13. An arrangement for positioning an object comprising a source of desired position control signals, means for providing actual position signals comprising a coherent light source and an interferometer for counting fringe lines established by said light source and representative of movement of the object, means for compensating for changes in the wave length of the light comprising means for continuously controlling the frequency of said coherent light, said compensating means comprising a carriage operable through a known, repeatable movement, light reflecting means disposed on said carriage, means for directing a portion of the coherent light available from said coherent light source toward and returning from said light reflecting means, a calibration interferometer producing an output fringe count pulse for each discrete change in position of such carriage, a digital counter operable by said output pulses of said interferometer, control means for presetting a first digital number in said counter, means for actuating said carriage through a known, repeatable movement, the first digital number being equal to the number of pulses obtainable from said calibration interferometer during said movement for a given rate of propagation of said coherent light, said counter thereby counting from the first number and retaining a second digital number after said movement, the second digital number being representative of count error caused by any change in the wave length of said coherent light in the path between said calibration interferometer and said light reflecting means, means converting the second digital number in said counter into a control signal, a frequency varying means for said light source, and means for applying the control signal to the frequency varying means.